United States Patent
Soria et al.

[15] 3,648,441
[45] Mar. 14, 1972

[54] APPARATUS FOR PURIFYING GASES

[72] Inventors: Alberto Olague Soria, Calle Urugnay 37 Desp 313; Avelino Martinez Sanchez, Avenue Emersen 0215, both of Mexico City, Mexico

[22] Filed: Mar. 9, 1970

[21] Appl. No.: 17,715

[30] Foreign Application Priority Data

Nov. 4, 1969 Mexico..............................115,085

[52] U.S. Cl..................................55/247, 55/256, 60/30 L, 261/87, 261/93
[51] Int. Cl.................................................B01d 47/02
[58] Field of Search..............55/220 ET, 230, 244, 247, 256, 55/406, 409, 223; 261/88, 90, 87, 92; 60/29, 30 L; 159/161, 16 A, 25

[56] References Cited

UNITED STATES PATENTS

| | | | |
|---|---|---|---|
| 442,112 | 12/1890 | Elliott | 55/247 |
| 1,144,193 | 6/1915 | Haas | 55/DIG. 30 |
| 1,538,335 | 5/1925 | Koehler | 60/30 L |
| 2,040,700 | 5/1936 | Magaton | 55/230 |
| 3,132,192 | 5/1964 | Lessmann | 55/DIG. 30 |

FOREIGN PATENTS OR APPLICATIONS 1,013,013  2/1965  Great Britain................55/DIG. 30

*Primary Examiner*—Bernard Nozick
*Attorney*—Pierce, Scheffler & Parker

[57] ABSTRACT

Apparatus for removing impurities and noxious materials from exhaust gases generated by the combustion of fuels in which the gases are passed through an agitation chamber containing an absorber liquid and provided with agitators for extraction of the impurities and noxious material therefrom.

1 Claims, 5 Drawing Figures

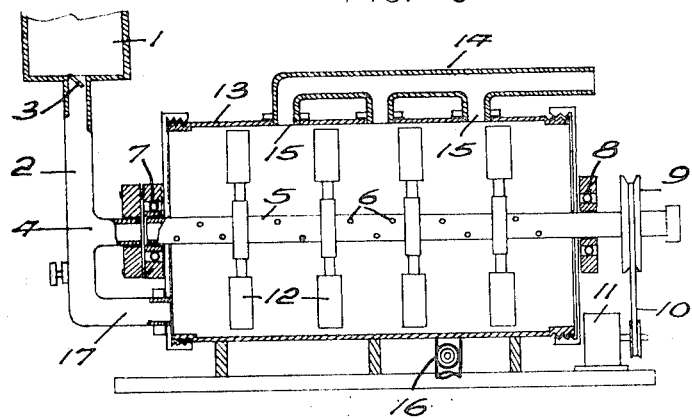
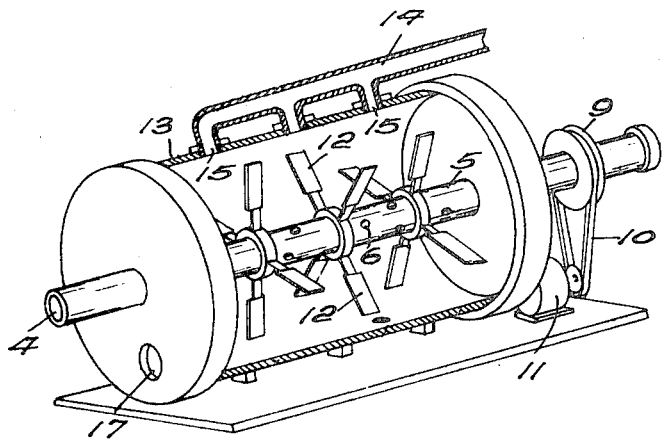

PATENTED MAR 14 1972 3,648,441
SHEET 2 OF 2
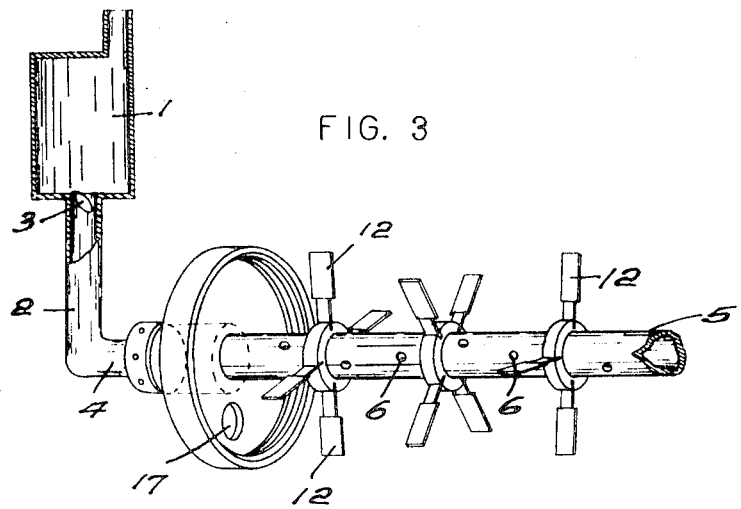
FIG. 3
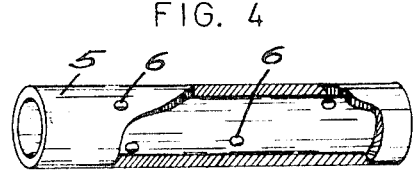
FIG. 4
FIG. 2
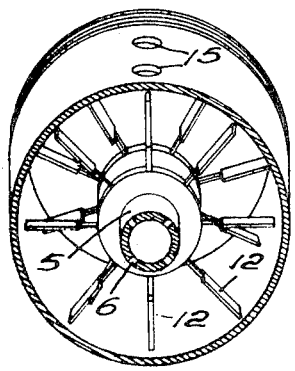
Inventors

APPARATUS FOR PURIFYING GASES

The apparatus of the present invention is for the purification of exhaust gases so that the poisonous gases and vapors present as well as undesirable solid particles are removed from the exhaust gases and are retained in the apparatus while the purified gases may be expelled therefrom.

According to the present invention the apparatus may be connected directly to the exhaust pipe of an industrial plant or it may be located at a central point so as to receive the exhaust gases from a plurality of sources through pipes or other connections thereto.

The gases which are treated in the apparatus and by the method of the present invention are subject to a turbulent mixing action with an absorber liquid. The absorber liquid may act as a chemical absorbent of various noxious gases and/or may act as a mechanical entrainer for solid particles therein, such as soot, fly ash and the like. In any particular installation, the nature of the impurities to be removed are considered and the absorber liquid is selected from those materials which will effectively absorb and/or entrain the impurities present. For example when soot or fly ash or the like is to be removed, the absorber liquid might well include an oily liquid, such as a mineral oil for entraining such solid particles to effectively remove them from the exhaust gases. On the other hand, when noxious gases are to be removed the absorber liquid will contain a liquid such as, water, which will absorb by solution or by chemical reaction those noxious gases which are to be removed from the exhaust gases. Clearly, when both solid particles and noxious gases such as carbon monoxide are present in the exhaust gases the absorber liquid may advantageously contain both an oily entraining agent as well as an absorbent and even though the two liquids might be immiscible in each other, this does not interfere with the operation of the present apparatus because of the turbulent mixing action in an agitation chamber where the exhaust gases are effectively scrubbed to purify them.

The invention will now be described by reference to the accompanying drawings in which:

FIG. 1 is a perspective view, partly cut away to illustrate the interior of the apparatus.

FIG. 2 is a perspective view showing the agitator of the apparatus.

FIG. 3, likewise is a perspective view showing the agitator of the apparatus with the casing removed.

FIG. 4 is a perspective view, partially in cross section of the distributor shaft of the apparatus, and FIG. 5 is a vertical cross-sectional view of the apparatus.

As shown in FIGS. 3 and 5 exhaust gases coming from an engine, motor or other source of exhaust gases and particularly from the internal combustion engines of automobiles, are passed into a storage chamber 1 and then into conduit 2 through the nonreturn valve 3. Conduit 2 has an exit 4 leading to distribution shaft 5 provided with openings 6 spaced longitudinally along and circumferentially about the shaft 5. The shaft 5 is mounted in bearings 7 and 8 at the ends thereof and may be rotated by pulley 9 or any other type of drive. As shown the pulley 9 is driven by belt 10 which is driven by a motor 11. However, it will be understood that the drive for shaft 5 may be the internal combustion engine itself from which the exhaust gases are to be purified.

The shaft 5 is provided with agitators 12 extending radially from the shaft and rotatable therewith. As shown the agitators 12 may be in the form of paddles to facilitate the agitation and comminution of the absorber liquid contained therein, as described hereinafter.

The shaft 5 is mounted in a casing 13, the ends of which are provided with the bearings 7 and 8 for the shaft 5.

At the top of the casing 13 there is provided an outlet pipe 14 which communicates with the interior of the casing 13 through a series of longitudinally spaced parts 15. The purified gases are passed from the casing 13 out through the ports 15 and pipe 14.

An absorber liquid of the kind previously described may be introduced into the casing 13 via valved opening 16 and when the liquid is spent and saturated with impurities removed from the gases it may be withdrawn for disposal through opening 16 and a fresh quantity of absorber liquid introduced therethrough.

The details of construction of the agitators 12 mounted on shaft 5 but with the casing 13 removed, are shown in FIG. 3 and the details of shaft 5 with the openings 6 therein are shown in FIG. 4.

During operation as exhaust gases enter the purifier, the agitators 12 are rotated and thus stir up and create a multitude of drops of the absorber liquid so as to increase the exposed surface thereof many fold. The gases passing through the purifier pass over and around these drops so that solid impurities, such as soot, ash etc., are mechanically entrained by the drops of liquid and the noxious gases are absorbed by solution or reaction with the liquid and are thus removed from the remaining purified gases.

In order to enhance purification of the gases and improve agitation of the absorber liquid the incoming gases in conduit 2 may be directed in part to inlet 17 at the lower portion of casing 13. Thus the gases will bubble through any liquid which may have settled to the bottom thereof and assist in the agitation thereof or these gases will pass through the rain or mist of the liquid from the bottom of casing 13 to the outlet ports 15 and thus traverse the entire diameter of the casing 13, coming in contact with a greater amount of the absorber liquid.

It will be understood that the exhaust gases entering chamber 1 will be under pressure which is normal for conventional exhaust gases from an internal combustion engine. In order to ensure that gases which have entered the purifier and have been purified by the absorber liquid will not return to the chamber even if there should be a temporary reduction of pressure, a nonreturn valve 3 is provided to prevent such return of purified gases.

It will also be understood that the apparatus may be modified in various ways without departing from the spirit of the invention. For example two or more outlet pipes 14 may be employed, if desired, for the removal of purified gases from the apparatus. Also a plurality of inlets 17, or a plurality of pipes 16 for the absorber liquid may be provided. Clearly the size and shape of the agitators 12 may be varied so as to provide adequate and suitable agitation for the absorber liquid, depending on the nature and composition thereof. For example when the requirements call for a relatively heavy or oily liquid for removal by entrainment of substantial quantities of solid impurities, the agitators will be advantageously designed to agitate such liquids to form a rain or mist thereof while in those instances where a relatively fluid liquid for absorption by solution or reaction is called for, the agitators, will be designed for such fluid liquids.

We claim:

1. Apparatus for removing unwanted components from exhaust gases comprising a chamber containing an absorber liquid, a hollow inlet shaft extending axially through said chamber and closed at one end, a conduit means including a first conduct connected to said shaft for introducing a first portion of the exhaust gases into said hollow shaft, means for rotating said shaft about its axis, said shaft being perforated whereby openings in said hollow shaft provide for passage of the first portion of the gases from said hollow shaft into said chamber, agitating means extending into the absorber liquid mounted on said hollow shaft for rotation therewith to agitate the liquid, a second conduit connected to said conduit means for passing a second portion of the gases from said conduit means to said chamber adjacent the bottom thereof into the absorber liquid, said second portion of the gases assisting in the agitation of absorber liquid which may have settled to the bottom of the chamber and means for removing purified gases from said chamber.

* * * * *

UNITED STATES PATENT OFFICE
CERTIFICATE OF CORRECTION

Patent No. 3,648,441      Dated March 14, 1972

Inventor(s) ALBERTO OLAGUE SORIA and AVELINO MARTINEZ SANCHEZ

It is certified that error appears in the above-identified patent and that said Letters Patent are hereby corrected as shown below:

Claim 1, line 5, "conduct" should be

-- conduit --

Signed and sealed this 29th day of August 1972.

(SEAL)
Attest:

EDWARD M. FLETCHER, JR.
Attesting Officer

ROBERT GOTTSCHALK
Commissioner of Patents